United States Patent [19]

Vance

[11] Patent Number: 5,707,064

[45] Date of Patent: Jan. 13, 1998

[54] MODULATED PRESSURE DAMPER SEAL

[75] Inventor: John M. Vance, Bryan, Tex.

[73] Assignee: The Texas A&M University System, College Station, Tex.

[21] Appl. No.: 542,304

[22] Filed: Oct. 12, 1995

Related U.S. Application Data

[63] Continuation-in-part of Ser. No. 233,043, Apr. 25, 1994, abandoned, which is a continuation-in-part of Ser. No. 2,336, Jan. 8, 1993, abandoned.

[51] Int. Cl.$^6$ .................................................. F16J 15/447
[52] U.S. Cl. ............................. 277/1; 277/53; 415/174.5
[58] Field of Search ..................... 277/1, 53, 54, 277/55, 215; 415/173.5, 174.5

[56] References Cited

U.S. PATENT DOCUMENTS

| | | | |
|---|---|---|---|
| 3,957,274 | 5/1976 | Lang | 277/4 |
| 4,057,362 | 11/1977 | Schwaebel | 415/170 R |
| 4,370,094 | 1/1983 | Ambrosch et al. | 415/172 |
| 4,411,437 | 10/1983 | Conti | 277/53 |
| 4,979,755 | 12/1990 | Lebreton | 277/1 |
| 5,088,889 | 2/1992 | Wolff | 415/171.1 |
| 5,106,104 | 4/1992 | Atkinson et al. | 277/1 |
| 5,522,698 | 6/1996 | Butler et al. | 277/53 |
| 5,540,447 | 7/1996 | Shultz et al. | 277/53 |

FOREIGN PATENT DOCUMENTS

| | | | |
|---|---|---|---|
| 28259 | 2/1925 | France | 277/53 |
| 11592227 | 12/1963 | Germany | 415/173.5 |
| 10134 | 1/1980 | Japan | 277/53 |
| 143104 | 8/1983 | Japan | 415/174.5 |
| 59-505 | 1/1984 | Japan | 415/174.5 |
| 191601 | 8/1987 | Japan | 415/174.5 |
| 282074 | 12/1991 | Japan | 277/53 |
| 1006832 | 3/1983 | U.S.S.R. | 277/53 |
| 1071852 | 2/1984 | U.S.S.R. | 277/53 |
| 1118827 | 10/1984 | U.S.S.R. | 277/53 |
| 1569485 | 6/1990 | U.S.S.R. | 277/53 |
| 1574914 | 6/1990 | U.S.S.R. | 415/174.5 |
| 280897 | 6/1928 | United Kingdom | 277/53 |
| 705444 | 3/1954 | United Kingdom | 277/53 |
| 2128693 | 5/1984 | United Kingdom | 277/53 |

OTHER PUBLICATIONS

J.M. Vance, et al., "Effect of Straight Through Labyrinth Seals on Rotordynamics," *Vance, Zierer and Conway*, pp. 1–13.

Joseph J. Zierer, Jr., "Effect of a Straight Teeth–on–Rotor Labyrinth Seal on Rotordynamics," Thesis submitted to the Office of Graduate Studies of Texas A&M University, Dec. 1991.

Eileen M. Conway, "The Effect of Teeth–on–Stator Labyrinth Seals on Rotor Imbalance Response," Thesis submitted to the Office of Graduate Studies of Texas A&M University, Aug. 1991.

B.T. Murphy and J.M. Vance, PhD., "Labyrinth Seal Effects on Rotor Whirl Instability," C306/80 published in the *Proceeding of the Second International Conference on Vibrations in Rotating Machinery*, Cambridge, England, Sep. 2–4, 1980.

J.S. Alford, "Protecting Turbomachinery from Self–Excited Rotor Whirl," *Journal of Engineering for Power*, ASME Transactions, Oct. 1965, pp. 333–344.

(List continued on next page.)

*Primary Examiner*—Scott Cummings
*Attorney, Agent, or Firm*—Baker & Botts, L.L.P.

[57] ABSTRACT

A damper seal (310) and method of sealing and damping a rotating shaft (312) are disclosed. The damper seal (310) includes a stator housing (314), a plurality of cavities ($C_1$, $C_2$, $C_3$, $C_4$), a first sealing blade (316) for modulating the fluid flow into the cavities, and a second sealing blade (318) with notches (330) and/or holes (340) for modulating the fluid flow exiting the cavities ($C_1$, $C_2$, $C_3$, $C_4$) less than the fluid flow entering the cavities ($C_1$, $C_2$, $C_3$, $C_4$) to provide improved damping and sealing.

8 Claims, 4 Drawing Sheets

OTHER PUBLICATIONS

George L. von Pragenau, "From Labyrinth Seals to Damping Seals/Bearings," Fourth International Symposium on Transport Phenomena and Dynamics of Rotating Machinery (ISROMAC-4), vol. A., Apr. 5-8, 1992, pp. 277-285.

J.M. Vance and J.L. Nikolajsen, Proposal entitled "Dampers for Advanced Engines," submitted by the Texas A&M Research Foundation to General Electric, Mar. 1988.

J.M. Vance, Progress report to General Electrics on "Gas Damper", Oct. 1990.

J. M. Lund, "Stability and Damped Critical Speeds of a Flexible Rotor in Fluid-Film Bearings" *Journal of Engineering for Industry*, May 1974, pp. 509-517.

M. Kurohashi, et al., "Spring and Damping Coefficients of the Labyrinth Seals," Paper No. C283/80, *Proceedings of the 2nd International Conference on Vibrations in Rotating Machinery* (*Institution of Mechanical Engineers*), held at Churchill College, Cambridge University, Sep. 1-4, 1980, pp. 215-222.

J.M. Vance, et al., "Effect of Labyrinth Seals on Rotordynamics of Turbomachinery" TRC Progress Report, TRC-Seals-6-85, Nov. 1985.

J. M. Vance, "Rotordynamics of Turbomachinery," *A Wiley-Interscience Publication*, Copyright 1988, pp. iii-xii and 254-260.

MODULATED PRESSURE DAMPER SEAL

RELATED APPLICATION

This application is a continuation-in-part of utility application Ser. No. 08/233,043 filed Apr. 25, 1994, entitled Modulated Pressure Damper Seals now abandoned, which is a continuation-in-part application of utility application Ser. No. 08/002,336, filed Jan. 8, 1993 now abandoned.

TECHNICAL FIELD OF THE INVENTION

This invention relates to rotary shaft seals, and more particularly to pressure damper seals for restricting fluid flow between segments of a rotating shaft that are at different pressure levels and damping vibratory motion of the shaft.

BACKGROUND OF THE INVENTION

Various sealing and damping systems are used with rotating machinery, e.g., turbojet engines, steam turbines, gas turbines, compressors, and pumps, to prevent fluids under pressure from leaking along a shaft in the rotating equipment and to minimize vibratory motion of the shaft. Such systems frequently include labyrinth seals and squeeze film dampers.

Squeeze film dampers are frequently used with rotating equipment that utilize ball bearings. Squeeze film dampers use an oil film contained in a loose clearance space provided around the outer race of the ball bearing elements. The oil provides a hydrodynamic, viscous action that generates pressure in the oil film that opposes vibratory motion and dissipates vibratory energy of a rotating shaft. Squeeze film dampers have a disadvantage in that they may only be placed where the bearing elements are located on the shaft, and typically the vibration amplitude is relatively small at the location of the bearing elements. Another disadvantage of squeeze film dampers is their temperature limitations; squeeze film dampers are less effective at higher temperatures due to the temperature limitations of the working fluid (oil).

Labyrinth seals are frequently used in rotating machinery to maintain a pressure differential between two adjacent portions on the exterior of a shaft. For example, labyrinth seals may be found in turbojet aircraft engines at each of the numerous turbine wheels along the longitudinal axis of the engine's shaft. There are numerous variations on labyrinth seals, but the typical labyrinth seal consists of a series of circular lands and annular grooves that present a tortuous flow path to the fluid. The lands and grooves of the typical labyrinth seal cooperate to provide minimum leakage while allowing radial or axial clearance between the shaft and associated stator or housing. While the labyrinth seal provides minimum leakage, the seal does not provide substantial damping of vibratory motion of the rotating shaft.

Another type of seal used to limit leakage of fluid between regions at different pressures along a shaft is the honeycomb seal. Honeycomb seals are frequently used in pumps and other types of rotating equipment employing incompressible fluids. Honeycomb seals typically utilize a stator with hexagonal cells lining the internal surface of the stator. The inner surface of the honeycomb-stator surrounds the shaft with a small clearance. The cells function to resist the flow of fluid past the cells. While there is some evidence that honeycomb-stator seals are more stabilizing than labyrinth seals in terms of vibration, honeycomb seals have the disadvantage of sometimes being damaged by high pressure drops and involving considerable effort and expense to manufacture.

Brush seals are sometimes used along rotating shafts in rotating machinery. Brush seals typically have low leakage, but also have little damping effect.

Another problem experienced with rotating shafts that is often caused by conventional seals is rotordynamic instability caused by cross-coupling due to fluid flow patterns around the shaft. In attempting to correct this problem, some manufacturers have added vanes upstream of a shaft seal that impose a fluid swirl opposite to the swirl induced by shaft rotation. This latter technique requires additional components which add weight to the overall system and can induce backward whirl of the rotor in certain speed ranges. Extra weight can be an undesirable limiting factor in some situations, such as in turbojet engines in aircraft. Thus, a need has arisen for a seal that prevents or greatly reduces fluid swirl about a rotating shaft while not requiring additional parts or components that add weight to the seal and are likely to cause more maintenance problems.

The performance goal for the next-generation aircraft engine is to double the thrust-to-weight ratio of present day engines. This will probably be achieved with increased operating temperatures and reduced weight. The increased operating temperatures will probably preclude the use of squeeze film dampers as damping devices. It is also desirable to reduce the vibration of the rotating shaft of jet engines for several reasons: (1) bearing life is increased by reducing the vibration; (2) reducing the vibration allows the blades to be placed with smaller clearances and thereby allows for greater efficiency; and (3) reducing the vibration reduces the noise of the engine. The effectiveness of using squeeze film dampers is limited because the dampers may only be placed where bearing elements are located along the shaft. Labyrinth and honeycomb seals are not very effective for reducing the vibratory motion of the shaft.

Thus, a need has arisen for an apparatus and method for damping vibration of a rotating shaft under high temperatures and at locations that may be away from bearing elements. Furthermore, it would be advantageous to have a method and an apparatus that could seal as well as damp under these conditions. A similar need has arisen in other areas involving rotating machinery, such as steam turbines, gas turbines, compressors, and pumps.

SUMMARY OF THE INVENTION

In accordance with the present invention, the disadvantages and problems associated with previously developed dampers and seals have been substantially reduced or eliminated by use of the present damper seal invention.

One aspect of the present invention provides an apparatus for maintaining a fluid barrier between areas along a rotating shaft having different fluid pressure at different locations along the shaft and for damping vibration and whirl of the shaft. The apparatus includes a housing disposed about the shaft, a plurality of cavities formed around the shaft, a means for modulating the fluid flow entering the cavities with respect to the vibrational displacement of the shaft, and a means for modulating the fluid flow exiting the cavities with respect to the vibrational displacement of the shaft less than the modulation of the fluid flow entering the cavities. Another aspect of the present invention includes notches or slots formed on the second sealing blade of a pair of sealing blades to allow unmodulated flow from the cavity. Another aspect of the present invention includes providing holes in the second sealing blade of a pair of sealing blades to provide for unmodulated flow from the cavity.

Another aspect of the present invention includes a method for maintaining a fluid barrier between areas along a rotating shafting having a housing over a portion of the shaft and for damping vibratory motion of the shaft. The method includes the steps of forming a plurality of cavities around the shaft, modulating the fluid flow entering the cavities with respect to any vibrational displacement of the shaft to develop a resultant pressure force that opposes the vibrational velocity, and modulating the fluid flow exiting the cavities with respect to the vibrational displacement less than the modulation of the fluid flow entering the cavities. According to an aspect of the present invention the reduced modulation of the fluid flow of the exiting blade of a cavity is accomplished by holes and/or notches.

The present invention has significant technical advantages in that a damper seal is provided to effectively damp the vibration of a rotating shaft at any point along the shaft where a conventional seal might be located, whether or not a bearing is located there. This is advantageous since the amplitude of vibration is frequently the greatest at points distant from bearing locations. Additionally, the present invention can operate at high temperatures. This latter advantage is significant because many future rotating shaft designs will most likely have high operating temperatures.

Yet another significant technical advantage of the damper seal of the present invention is that it eliminates or greatly reduces fluid swirl about the shaft. This aspect of the present invention operates to prevent or reduce cross-coupling and the instability (rotordynamic instability) associated therewith.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The preferred embodiments of the present invention and its advantages are best understood by referring to FIGS. 1–9 of the drawings, like numerals being used for like and corresponding parts of the various drawings.

The damper seal of the present invention includes an improved means for sealing and damping vibration and whirl of shafts in rotating machinery using compressible fluids. The damper seal of the present invention may be used with various types of rotating machinery such as turbine generators, turbojet engines, compressors and pumps (not shown). The improved damping and sealing of the invention may be obtained through forming a plurality of fluid cavities about the rotating shaft and modulating the flow into the cavities with respect to vibrational displacement of the shaft more than the modulation of the flow exiting the cavities; this causes the pressure in all cavities to change with time at substantially the same frequency as the shaft whirl speed and in a manner that allows the resultant pressure force on the shaft to continuously oppose the shaft's vibrational velocity.

Figure 1:
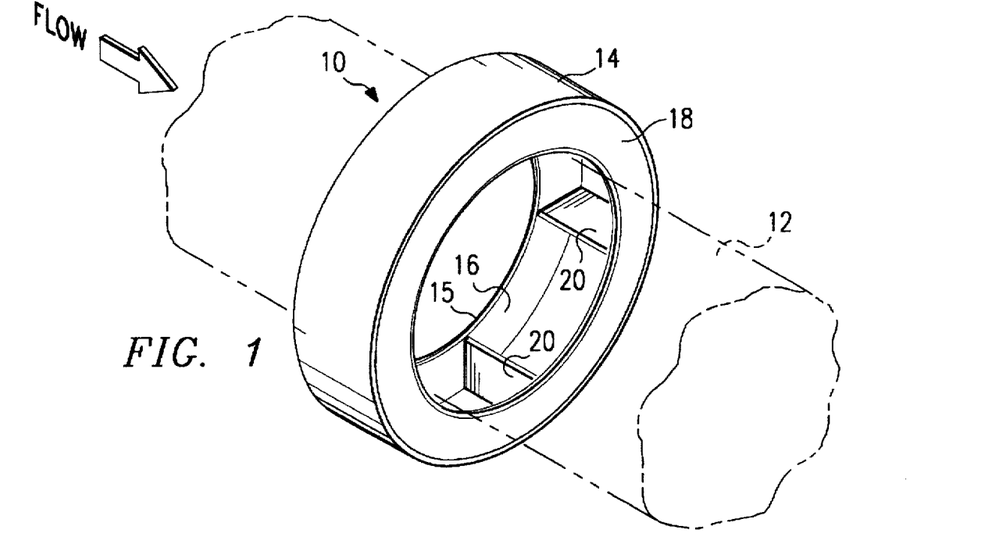
FIG. 1 is a perspective view of one embodiment of the present invention.

Referring to FIG. 1, damper seal 10 is shown on the exterior of shaft 12. Damper seal 10 functions to seal or restrict the flow of fluid from a region upstream from damper seal 10 to a region downstream from damper seal 10 and to damp vibratory motion, or whirl, of shaft 12.

In accordance with one embodiment (shown in FIG. 1), damper seal 10 comprises a set of sealing blades 16 and 18 which are attached to stator housing or non-rotating collar 14 and which extend inwardly toward shaft 12. Sealing blades 16 and 18 have the general configuration of annular disks with openings through which rotating shaft 12 extends. One suitable material for blades 16 and 18 and other blades mentioned herein is TORLON, which is manufactured by AMOCO. One of the sealing blades, the first or upstream sealing blade 16, is located upstream in the fluid flow from the other or second blade, which is the downstream sealing blade 18.

A plurality of partitioning walls or segregating walls 20 are positioned longitudinally between sealing blade 16 and sealing blade 18 on the interior of stator housing 14. Partitioning walls 20 may be attached longitudinally to stator housing 14 and perpendicular to sealing blades 16 and 18 and perpendicular to a tangent line about annular stator housing 14 at the point of contact between stator 14 and partitioning walls 20. Other embodiments may have partitioning walls 20 attached in like manner without being perpendicular to the tangent line about stator housing 14, i.e., attached at an angle.

Partitioning walls 20 may perform several important functions within damper seal 10. Partitioning walls 20 provide structural support to prevent longitudinal movement or flexing of sealing blades 16 and 18 relative to rotating shaft 12. As will be explained later in more detail, partitioning walls 20 also divide the interior of damping seal 10 into a plurality of fluid cavities or pockets. Each fluid cavity is defined in part by its associated partitioning wall 20, sealing blades 16 and 18, the exterior of rotating shaft 12 adjacent to damper seal 10, and the interior of stator housing 14.

Figure 2A:
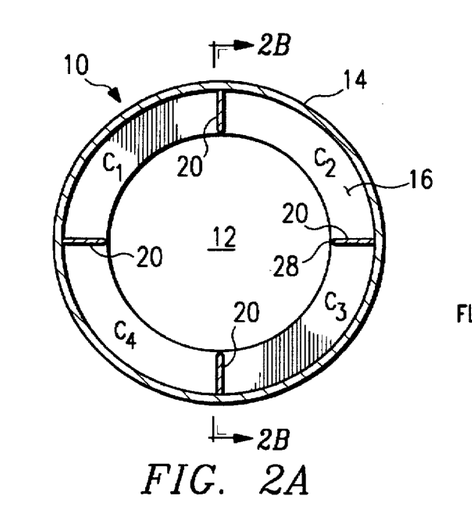
FIG. 2A is a radial section of one embodiment of the present invention taken at the center of the stator housing.

Referring now to FIG. 2A, there is shown a radial section of the embodiment of FIG. 1 taken about the center of stator housing 14. In accordance with FIG. 2A, a plurality of partitioning walls, in this case four partitioning walls 20, have been evenly distributed about the inner circumference of stator housing 14 to form a plurality of fluid cavities or pockets $C_1$, $C_2$, $C_3$ and $C_4$. Partitioning walls 20 function to separate cavities $C_1$, $C_2$, $C_3$ and $C_4$.

Figure 2B:
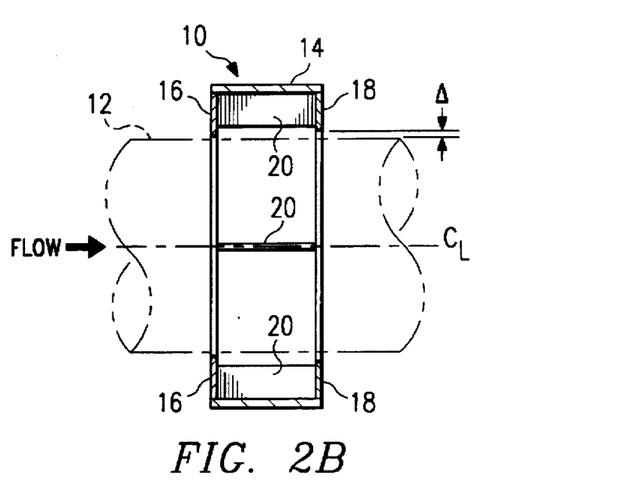
FIG. 2B is a longitudinal section of one embodiment of the present invention taken just off the center of the longitudinal axis of the shaft and stator housing (FIG. 2B is a section view taken along the section lines 2B—2B of FIG. 2A)

Referring now to FIG. 2B, upstream sealing blade 16 is attached to stator housing 14 so that there exists a first predetermined clearance between edge 15 of upstream sealing blade 16 and shaft 12. Other embodiments, such as the embodiments of FIGS. 8 and 9, do not require the diverging clearance described in connection with FIG. 2B. Likewise, downstream sealing blade 18 is attached to stator housing 14 to create a second predetermined clearance between shaft 12 and edge 13 of second sealing blade 18. The clearance of the edge of downstream sealing blade 18 and shaft 12 is greater than the clearance of the edge of upstream sealing blade 16 and shaft 12, i.e., diverging (the difference in clearances is designated by $\Delta$); for example, the clearance between sealing blade 18 and shaft 12 may be twice the clearance of sealing blade 16 and shaft 12. The predetermined clearances are sized to provide a sealing effect similar to conventional labyrinth seals. Partitioning walls 20 are attached to sealing blades 16 and 18 by welding or other means known in the art so that partitioning walls 20 maintain substantially the same clearance between walls 20 and shaft 12 along their longitudinal dimension. This latter arrangement is more clearly shown in FIG. 3, which is an exploded schematic representation of a portion of damper seal 10 as shown in FIG. 2B.

Damper seal 10 operates to restrict the flow of fluid from upstream the damper seal to downstream the damper seal and thereby maintains a pressure differential between the two regions. Sealing is accomplished by sealing blades 16 and 18 forming a tortuous path for the flow of the fluid. Additionally, damper seal 10 operates to damp any vibratory motion. Damper seal 10 uses pressure differentials to create forces that damp whirling, rotating shaft 12. Referring again to FIG. 2A, assume a counter-clockwise rotation of a whirling shaft 12, i.e., a shaft 12 having a rotating orbit with less than a perfect circular shape. Consider shaft 12 at a reference point 28 located at the three o'clock position on the circumference of shaft 12. The whirl is counter-clockwise and thus shaft 12 is moving up, and the displacement of the shaft is toward reference point 28. As the shaft moves upward, the clearances of sealing blades 16 and 18 located adjacent to cavities $C_4$ and $C_3$ are increasing or opening up, and the clearances of sealing blades 16 and 18 adjacent to cavities $C_1$ and $C_2$ are decreasing or closing.

Figure 3:
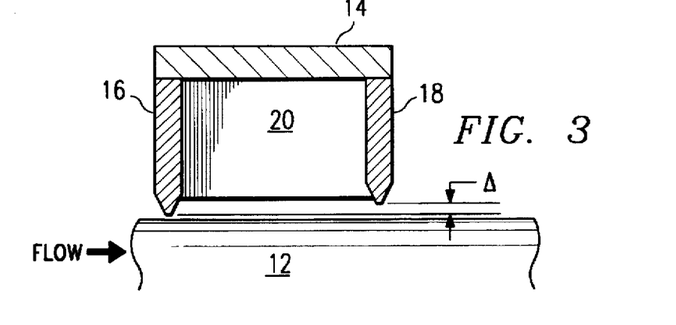
FIG. 3 is an exploded schematic representation of a portion of the damper seal shown in FIG. 2B.
Figure 4:
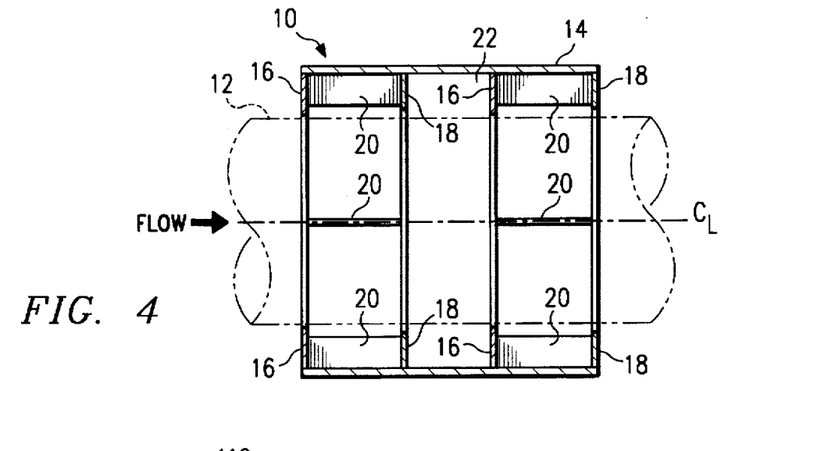
FIG. 4 is a longitudinal section of one embodiment of the present invention taken just off the center of the longitudinal axis of the shaft and stator housing.

Referring now to FIG. 2B, one may visualize that as shaft 12 is displaced in one direction, the percent rate of change of the clearance between shaft 12 and upstream sealing blade 16 is different than the percent rate of change in the clearance between shaft 12 and downstream sealing blade 18 because of the difference in clearances, $\Delta$. Thus, pressure in cavities $C_1$, $C_2$, $C_3$ and $C_4$ will vary as a function of the shaft displacement and at the same frequency as the shaft whirl. The design is such that the dynamic pressure in the cavities $C_1$, $C_2$, $C_3$ and $C_4$ leads the whirl displacement vector by a phase angle of approximately 90 degrees, and thus a net force is developed by the pressure differences of cavities $C_1$, $C_2$, $C_3$ and $C_4$ that substantially opposes the instantaneous velocity vector of the whirling shaft. In the given example, a net force would be produced by cavities $C_1$, $C_2$, $C_3$ and $C_4$ that opposes the velocity of the whirl, which would be vertical at the described moment. Referring now to FIG. 4, there is shown a second embodiment. Stator housing 14 has two pairs of sealing blades 16 and 18 attached to it. Each pair of sealing blades 16 and 18 is arranged similarly to those shown in FIG. 2B, but are separated by an annular cavity 22. Upstream sealing blades 16 have a smaller clearance relative to shaft 12 than do downstream sealing blades 18. Additional pairs of sealing blades 16 and 18 separated by a non-partitioned cavity 22 may be attached to the stator housing in a like manner to form various embodiments of the present invention; for example, a damper seal 10 could be formed with three pairs of sealing blades 16 and 18. Traditional labyrinth components could be placed in cavity 22 to further enhance sealing. This embodiment operates in a similar manner to the embodiment shown in FIGS. 1–3, but may provide improved sealing and damping in some environments.

Figure 4A:
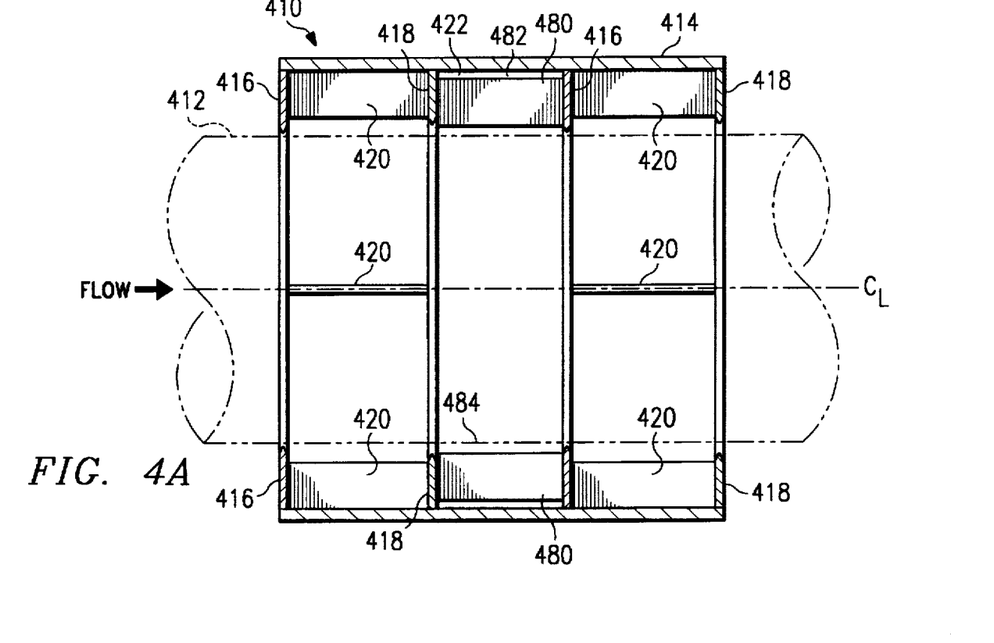
FIG. 4A is a longitudinal section of another embodiment of the present invention taken just off the center of the longitudinal axis of the shaft and stator housing.

Referring now to FIG. 4A, there is shown another embodiment 410. Stator housing 414 has two pairs of sealing blades 416 and 418 attached to it. Each pair of sealing blades 416 and 418 is arranged similarly to those shown in FIGS. 2B and 4, but within annular cavity 422 are flow dams 480. Flow dams 480 within cavity 422 may be attached at one end to downstream sealing blade 418 and at the other end to upstream sealing blade 416. Flow dams 480 are positioned with a clearance 482 formed between flow dam 480 and stator housing 414 and with a second clearance 484 between flow dam 480 and shaft 412. Flow dams 480 may be spaced about shaft 412. Thus, flow dams 480 may help to prevent swirl along shaft 412.

Figure 5:
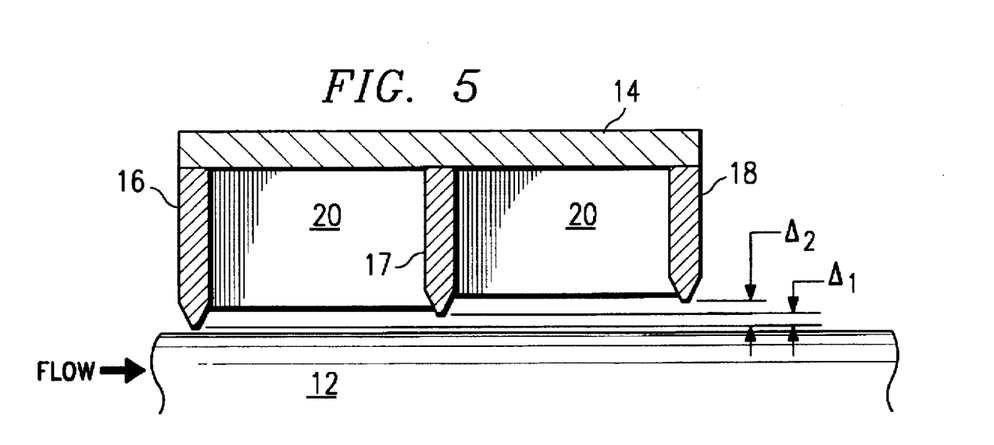
FIG. 5 is a schematic representation of a portion of one embodiment of the damper seal showing the clearances of adjacent sealing blades.

FIG. 5 is a schematic view of a section of a third embodiment of damper seal 10 taken about the longitudinal axis. This embodiment illustrates the addition of sealing blades in larger groups. For example a damper seal 10 could be formed by securing three sealing blades 16, 17, and 18 to a stator housing 14 wherein the clearance between each sealing blade and shaft 12 increases along the flow path, i.e., $\Delta_2 > \Delta_1$. This embodiment operates in a similar manner as shown in FIGS. 1–3, i.e., other components, e.g., partitioning walls 20, are included in the same manner as shown in FIGS. 1–3.

Figure 6:
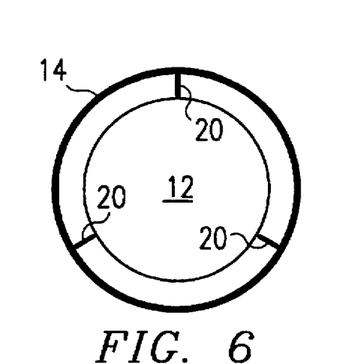
FIG. 6 is a radial section of one embodiment of the present invention.
Figure 7:
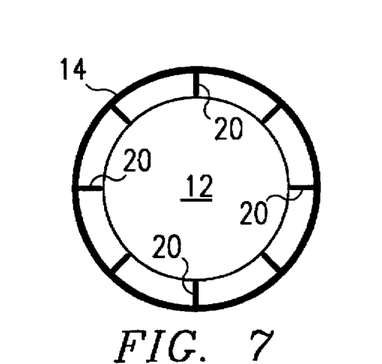
FIG. 7 is a radial section of one embodiment of the present invention.

Referring now to FIGS. 6 and 7, two different radial sections of damper seal 10 are shown. The sectional views show that the number of partitioning walls 20 may be varied. In the embodiments shown, partitioning walls 20 are evenly spaced about the inner circumference of stator housing 14, but designs with unevenly spaced partitioning walls 20 are desirable in some situations depending on the characteristics of rotating shaft 12.

Figure 8:
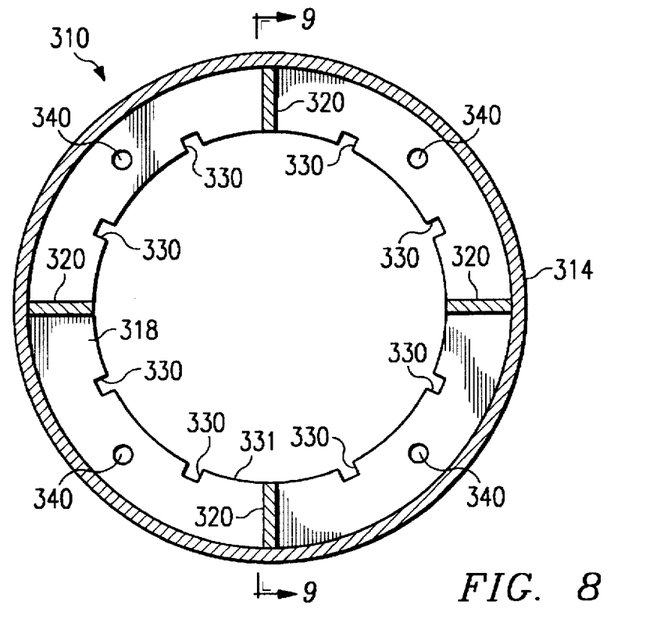
FIG. 8 is a transverse sectional view of an embodiment of the present invention.
Figure 9:
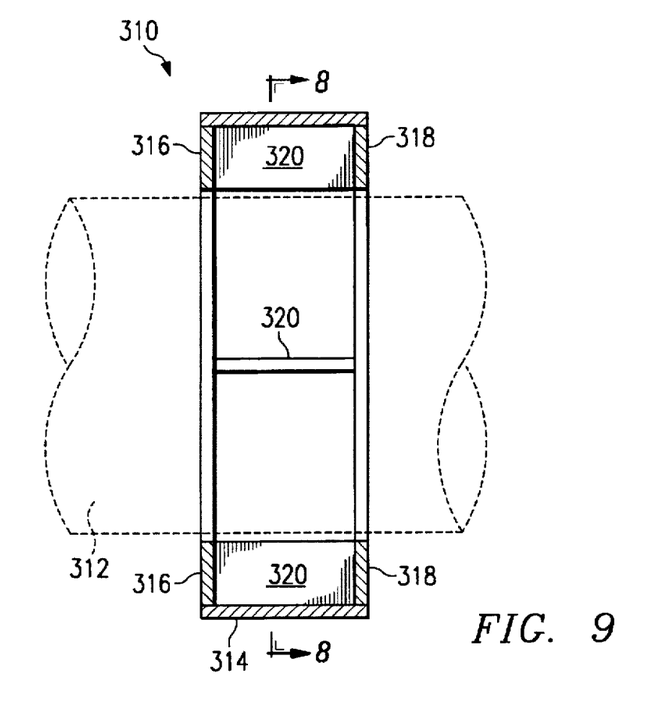
FIG. 9 is a longitudinal sectional view taken along line 21—21 of FIG. 8.

Another technique for modulating the fluid flow into cavities about a rotating shaft more than the modulation of the fluid flow out of the cavities includes using holes or notches or both on the downstream or second portion of the damper seal. Referring now to FIGS. 8 and 9, such an embodiment of the present invention is shown. Damper seal 310 is analogous to damper seal 10 of FIG. 1 in many respects. Damper seal 310 has a first or upstream sealing blade 316, which is coupled to a housing 314, and a plurality of partitioning walls 320, which are coupled to housing 314 and a portion of upstream blade 316. Partitioning walls 320 form a number of cavities such as cavities $C_1$, $C_2$, $C_3$, and $C_4$, as shown in FIG. 2A. Damper seal 310 has a second sealing blade 318. In this embodiment, to modulate the fluid flow into the cavities about the rotating shaft 312, more than the modulation of the fluid flow out of the cavities, notches or slots 330 and/or holes or apertures 340 may be formed in second or downstream sealing blade 318. Notches 330 are shown on an inner edge 331 of the second sealing blade 318. Notches 330 and/or holes 340 in blade 318 allow leakage through the exit which is not modulated by the vibratory motion of the shaft. Therefore, in this embodiment it is not necessary to have the second blade 318 with a clearance greater than the first blade 316 as in the embodiment of FIG. 1. The optimum total flow area of notches 330 and/or holes 340 is believed to be equal to the flow area of the clearance between the upstream blade 316 and the sealed journal or shaft 312. Because the sealing blades 316 and 318 may be formed with the same clearances, the embodiment may reduce leakage and may be easier to manufacture than other designs.

The present invention has been described for a rotating shaft, but the invention is also applicable to a stationary shaft and a rotating housing. Damper seals 10 and 310 may be applied generally with a rotating structural member, which may be a shaft or a housing; however, if the housing is rotating, the embodiment would have the blades and partitioning walls mounted on the shaft. Additionally, while the present invention has been generally shown with four cavities, it should be understood that more or fewer cavities might be used. Furthermore, although the present invention has been described in detailed embodiments, it should be understood that various changes, substitutions and alterations can be made herein without departing from the spirit and scope of the invention as defined by the appended claims.

What is claimed is:

1. An apparatus for maintaining a fluid barrier between areas along a rotating shaft and for damping whirl of the shaft comprising:

a stator housing enclosing the area of the rotating shaft to be sealed and allowing the shaft to rotatably pass through said housing;

an upstream and a downstream sealing blade attached to the stator housing with a first clearance between the upstream sealing blade and the shaft and a second clearance between the downstream sealing blade and the shaft;

a plurality of partitioning walls having a first and second end and a longitudinal edge, the end attached to the upstream sealing blade and the second end attached to the downstream sealing blade and the longitudinal edge attached to the stator housing to form a plurality of fluid cavities having an opening adjacent the rotating shaft;

wherein the downstream sealing blade is formed with a plurality of notches formed on an inner edge of the downstream sealing blade for providing a fluid flow past the downstream sealing blade that is less modulated than the fluid flow into the plurality of cavities, the fluid flow past the downstream sealing blade having some modulation and wherein first clearance and the second clearance are approximately the same dimension.

2. The apparatus of claim 1 wherein a flow area defined by the second clearance and the plurality notches is approximately twice a flow area defined by the first clearance.

3. An apparatus for maintaining a fluid barrier between areas along a rotating shaft and for damping whirl of the shaft comprising:

a stator housing enclosing the area of the rotating shaft to be sealed and allowing the shaft to rotatably pass through said housing;

an upstream and a downstream sealing blade attached to the stator housing with a first clearance between the upstream sealing blade and the shaft and a second clearance between the downstream sealing blade and the shaft;

a plurality partitioning walls having a first and second end and a longitudinal edge, the end attached to the upstream sealing blade and the second end attached to the downstream sealing blade and the longitudinal edge attached to the stator housing to form a plurality of fluid cavities having an opening adjacent the rotating shaft;

wherein the downstream sealing blade is formed with a plurality of notches formed on inner edge of the downstream sealing blade for providing a fluid flow past the downstream sealing blade that is less modulated than the fluid flow into the plurality of cavities, the fluid flow past the downstream sealing blade having some modulation; and wherein the upstream sealing blade is devoid of notches and holes.

4. An apparatus for maintaining a fluid barrier between areas along a rotating shaft and for damping whirl of the shaft comprising:

a stator housing enclosing the area of the rotating shaft to be sealed and allowing the shaft to rotatably pass through said housing;

an upstream and a downstream sealing blade attached to the stator housing with a first clearance between the upstream sealing blade and the shaft and a second clearance between the downstream sealing blade and the shaft;

a plurality of partitioning walls having a first and second end and a longitudinal edge, the first end attached to the upstream sealing blade and the second end attached to the downstream sealing blade and the longitudinal edge attached to the stator housing to form a plurality of fluid cavities having an opening adjacent the rotating shaft;

wherein a plurality of holes are formed on the downstream sealing blade for providing a fluid flow past the downstream sealing blade that is less modulated than the fluid flow into the plurality of cavities, the fluid flow past the downstream sealing blade having some modulation; and wherein the first clearance and the second clearance are approximately the same dimension.

5. The apparatus of claim 4 wherein a flow area defined by the second clearance and the plurality of holes is approximately twice a flow area defined by the first clearance.

6. An apparatus for maintaining a fluid barrier between areas along a rotating shaft and for damping whirl of the shaft comprising:

a stator housing enclosing the area of the rotating shaft to be sealed and allowing the shaft to rotatable pass through said housing;

an upstream and a downstream sealing blade attached to the stator housing with a first clearance between the upstream sealing blade and the shaft and a second clearance between the downstream sealing blade and the shaft;

a plurality of partitioning walls having a first and second end and a longitudinal edge, the first end attached to the upstream sealing blade and the second end attached to the downstream sealing blade and the longitudinal edge attached to the stator housing to form a plurality of fluid cavities having an opening adjacent the rotating shaft;

wherein a plurality of holes are formed on the downstream sealing blade for providing a fluid flow past the downstream sealing blade that is less modulated than the fluid flow into the plurality of cavities, the fluid flow past the downstream sealing blade having some modulation; and wherein the upstream sealing blade is devoid of notches and holes.

7. A method for sealing segments of a rotating shaft having fluid along the shaft and have the fluid at different pressure levels along the shaft and for dampening the vibratory motion of said shaft, the method comprising the steps of:

positioning a stator housing around a portion of the shaft;

attaching an upstream and a downstream sealing blade with a first clearance between the upstream sealing blade and the shaft and a second clearance between the downstream sealing blade and the shaft; p1 attaching a plurality of partitioning walls between the upstream and downstream sealing blades to form a plurality of fluid cavities having an opening adjacent to the shaft:

forming a plurality of holes in the downstream sealing blade such that the flow past the downstream blade through the holes and the second clearance are less modulated than the flow into the cavities through the first clearance, the fluid flow past the downstream sealing blade having some modulation; and wherein the step of attaching an upstream sealing blade comprises the step of attaching an upstream sealing blade devoid of holes or notches.

8. A method for sealing segments of a rotating shaft having fluid along the shaft and having the fluid at different pressure levels along the shaft and for dampening the vibratory motion of said shaft, the method comprising the steps of:

positioning a housing around a portion of the shaft;

attaching an upstream and a downstream sealing blade with a first clearance between the upstream sealing blade and the shaft and a second clearance between the downstream sealing blade and the shaft;

coupling a plurality of partitioning walls between the upstream and downstream sealing blades to form a plurality of cavities having an opening adjacent the shaft;

forming a plurality of notches on an interior portion of the downstream sealing blade for providing fluid flow past the downstream blade through the notches and the second clearance that is less modulated than the flow into the cavities, the fluid flow past the downstream sealing blade having some modulation; and wherein the step of attaching an upstream sealing blade comprises attaching an upstream sealing blade that is devoid of holes or notches.

* * * * *